Sept. 7, 1926.  
R. K. WALKER  
ENGINE  
Filed Feb. 5, 1924  
1,599,306

R. K. Walker, INVENTOR

BY Victor J. Evans

ATTORNEY

WITNESS:

Patented Sept. 7, 1926.

1,599,306

UNITED STATES PATENT OFFICE.

RICHARDSON K. WALKER, OF EDGEFIELD, SOUTH CAROLINA.

ENGINE.

Application filed February 5, 1924. Serial No. 690,866.

This invention relates to improvements in internal combustion engines and has for an object the provision of means for reducing vibration and strain upon the main bearings by providing a more perfect balanced, smoother running engine; reducing the number of connecting rod bearings for a given number of cylinders and providing a sectional crank shaft, whose sections may be readily replaced if necessary.

With the above and other objects in view, the invention further includes the following novel features and details of construction, to be hereinafter more fully described, illustrated in the accompanying drawings and pointed out in the appended claims.

In the drawings:—

Figure 1:
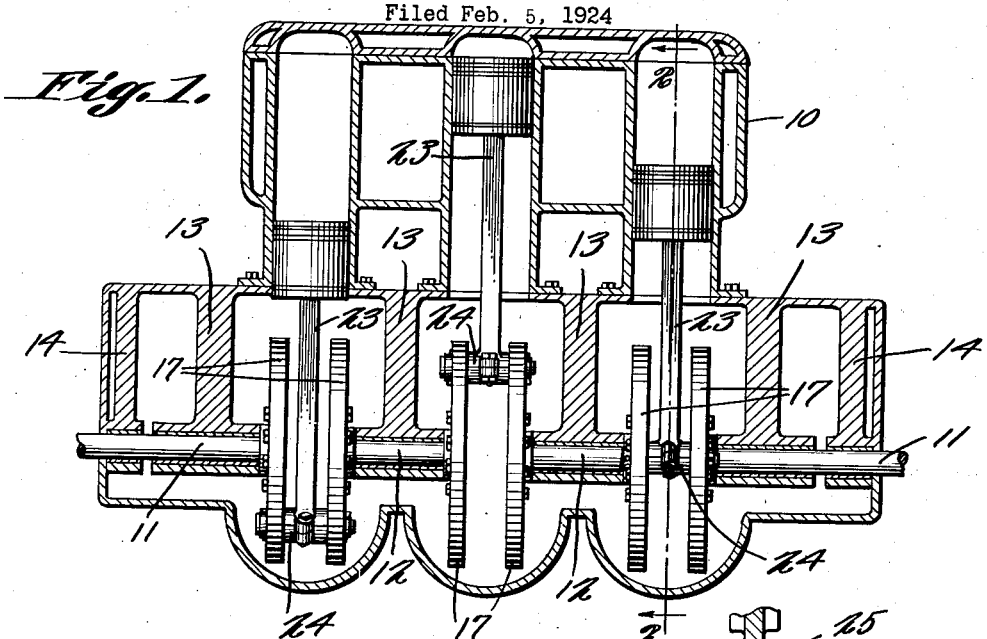
Figure 1 is a longitudinal sectional view through a multiple cylinder engine of the V type and illustrating the invention.

Referring to the drawings in detail wherein like characters of reference denote corresponding parts, the reference character 10 indicates the cylinders of a V type internal combustion engine, the engine shown being a six cylinder engine, but it is of course obvious that the number of cylinders may vary.

The crank shaft of the engine is of sectional formation and includes end sections 11 and intermediate sections 12, the said shaft being mounted in four large main bearings 13 and two relatively small bearings 14. The inner ends of the sections 11 of the crank shaft and both ends of the sections 12 of the said shaft are provided with disks or flanges 15 and shoulders 16, the latter acting as thrust bearings against the main bearings 13.

Removably secured to the disks 15 as by bolts or other suitable fastening devices, are relatively large disks 17, there being six of these disks for a six cylinder engine, eight for an eight cylinder engine and so forth. The disks 17 are connected by pins 18 and the latter are provided with substantially central cylindrical portions 19 and tapered end portions 20, the tapered portions 20 extending through correspondingly shaped openings 21 provided in the disks 17. The pins 19 are secured in place by tapered pins 22.

Figure 2:
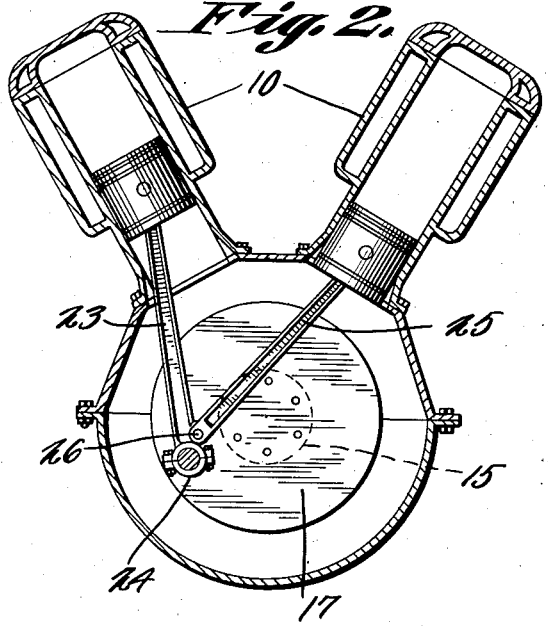
Figure 2 is a section on the line 2—2 of Figure 1.
Figure 3:
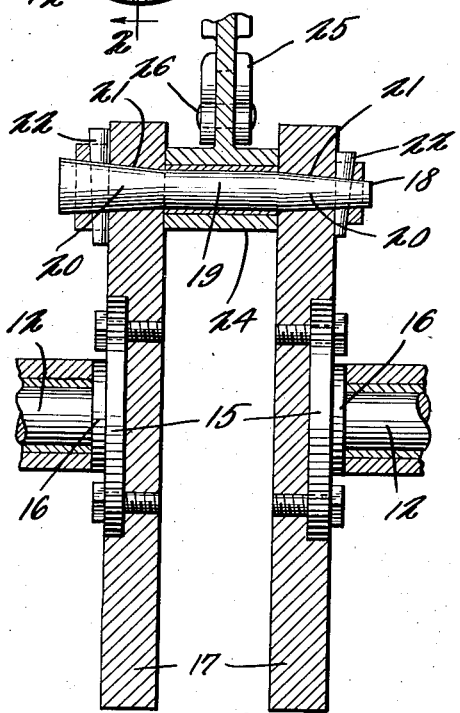
Figure 3 is an enlarged fragmentary section taken longitudinally of the crank shaft.

In an engine of this character, the usual fly wheel is dispensed with in that it provides an uneven balance for the crank shaft, the disks 17 in addition serving as a means of connection between the sections 11 and 12 of the shaft, act to provide balance disks for the shaft, their combined weight equaling the weight of the usual fly wheel. By means of these disks, the weight of the usual fly wheel is evenly distributed throughout the length of the shaft so that a more perfect balance is assured. The pins 19 provide means of connection with the connecting rods of the engine pistons. These rods are arranged as shown in Figure 2 of the drawings and as shown are arranged in pairs. One rod 23 of each piston is preferably formed integral with the connecting rod bearing 24, while the other rod 25 of each pair is detachably secured to a lug provided on the bearing as shown at 26, so that a single bearing suffices for two rods.

Should any of the crank shaft sections become worn or damaged, they may be easily replaced without replacing the entire crank shaft so that the motor may be quickly and economically repaired.

In a six cylinder engine the connecting rods of each pair of cylinders are attached to the disks 17 so that each time the latter makes one third of a revolution, two of the pistons reach their highest point. When the first piston on the left is at its highest point, the second piston on the right is at its highest point; the first piston on the right then lacks one-third of a turn of the disks 17 of being at its highest point, while the third piston on the left lacks the same. The second piston on the left lacks two-thirds of a revolution of the disks of being at its highest point and the third piston on the right is in the same position. The firing order will therefore be No. 1 left, No. 1 right, No. 2 left, No. 2 right, No. 3 left and No. 3 right. The size of the disks 17 which really provide a plurality of fly wheels or a plurality of fly wheel sections, the angle of the cylinders and the distance between the fly wheels and cylinders is such that, in each pair of cylinders travelled by the fly wheel from the time the piston on the left reaches its highest point until the piston on the right reaches its highest point is exactly one-third of a revolution.

Eight or twelve cylinders will be built on the same principle, the eight cylinder engine having eight fly wheels or eight fly wheel sections with five large main bearings and two small ones. Each revolution of the fly wheel will bring the pistons to their highest points and the firing order will be No. 1 left, No. 1 right, No. 2 left, No. 2 right, No. 3 left, No. 3 right, No. 4 left and No. 4 right.

The invention is susceptible of various changes in its form, proportions and minor details of construction and the right is herein reserved to make such changes as properly fall within the scope of the appended claims.

Having described the invention what is claimed is:—

1. In a multiple cylinder engine, a sectional crank shaft, a balance disk removably secured to each of the adjacent ends of the crank shaft sections and providing a plurality of fly wheels spaced along the shaft, pins connecting said fly wheels having central cylindrical portions and tapered end portions extending through correspondingly shaped openings in the fly wheel and key pins extending through the tapered ends of the first pins upon the outer face of the fly wheels for retaining said first pins in position.

2. In a multiple cylinder engine, a sectional crank shaft including end sections and intermediate sections, shoulders formed on the inner ends of the end sections and both ends of the intermediate section, annular flanges integral with said shoulders, bearings for the sections of said shaft, said shoulders acting as thrust bearings against certain of the first mentioned bearings, fly wheels at each end of the intermediate sections and at the inner ends of the end sections adapted to be removably connected to said flanges and a plurality of connecting rods secured to said fly wheels.

In testimony whereof I affix my signature.

RICHARDSON K. WALKER.